United States Patent Office 3,238,141
Patented Mar. 1, 1966

3,238,141
THICKENED SALT SOLUTIONS
Eugene M. Gatza, Bay City, Mich., assignor to The Dow Chemical Company, Midland, Mich., a corporation of Delaware
No Drawing. Filed June 7, 1961, Ser. No. 120,862
7 Claims. (Cl. 252—316)

The present invention concerns thickened liquid compositions and, more particularly, it relates to compositions comprising an aqueous solution of certain water-soluble, inorganic salts and an organic thickening system of a water-dispersible polymer sulfonate and a water-soluble, organic thickening promoter of the invention.

"Polymer sulfonates," as employed herein, refers to polymeric resins having a molecular weight above about 1000 which resins are highly substituted with sulfonic groups. The terminology "water-dispersible" as applied to the polymer sulfonates means dispersible in water so as to form a visually homogeneous solution or dispersion. Such language is inclusive of those polymer sulfonates which are characterized in the art as water-soluble or highly water swellable. "Water-soluble," for the purposes of the invention, means significantly water-soluble such as, for example, at least about 1 part of the solute per 100 parts of water.

The effectiveness of water-dispersible polymer sulfonates as thickeners in aqueous compositions is known to vary according to the molecular weight of the polymer, the degree of substitution of sulfonic groups thereon and the linearity of the polymer. Also having an important bearing on the thickening achieved are such factors as the presence of an electrolyte in the solution, the chemical character of such electrolyte and its concentration. In the latter regard, for instance, it is known that inorganic, electrolytic salts depress the viscosity of aqueous solutions thickened with polymer sulfonates and when present in sufficient concentrations, prevent dissolution of the polymer sulfonate. This effect is believed to be attributable to certain interionic phenomena which affect the polymer configuration and, therefore, it thickening properties. For an illuminating discussion of such interionic effects, see Fuoss and Strauss, "Viscosity of Mixtures of Polyelectrolytes in Simple Electrolytes," Annals of New York Academy of Sciences, volume 51, pages 836–851 (1949).

There are needs for viscous compositions of aqueous salt solutions for use in industry as hydraulic transmission media, and fluid displacement media in oil well treatments. Another application of thickened salt solutions is in operations involving electrodialysis wherein a gelled phase capable of transmitting ions is employed as a separator between two relatively fluid phases.

Since the presence in solution of the electrolytic salts either substantially decreases or completely prevents the achievement of any thickening with water-dispersible polymer sulfonate, it is highly desirable to enhance the effectiveness of such polymer sulfonate thickeners in the presence of such electrolytes.

Accordingly, it is the principal object of the present invention to provide improved techniques for thickening aqueous compositions comprising one or more water-soluble, inorganic, electrolytic salts. In particular, it is an object of the invention to enhance the thickening effect achieved by incorporating water-dispersible polymer sulfonates in such aqueous compositions. Still other objects are to provide novel thickened compositions most advantageously adapted for employment in hydraulic operations, treatment of oil wells and electrodialysis operations. Other objects and benefits attending the practice of the present invention will become manifest hereinafter as the invention is more full described.

In the present invention, the above and other objects are accomplished in a thickening system for aqueous compositions containing a water-soluble, inorganic, electrolytic salt, which thickening system comprises small but effective amounts of a water dispersible, polymer sulfonate and a suitable thickening promoter to enhance the thickening effect achieved. Suitable thickening promoters include water-soluble alkylene and polyoxyalkylene glycols and alkyl and aryl monoethers thereof. Preferred glycols and monoethers of the glycols correspond to the general formula:

$$R\text{—}O\text{—}(C_nH_{2n}O)_x\text{—}H$$

wherein R is of the group consisting of hydrogen, alkyls having from 1 to 4 carbons, aryls having from 6 to 10 carbons, $n$ is an integer from 2 to 3, inclusive, and $x$ is an integer from 1 to 6, inclusive. Also suitable are lower alkanols containing from 2 to 4 carbon atoms, glycerine, pentaerythritol dimethylformamide, dimethylacetamide, dioxan, tetrahydrofuran, furfuryl alcohol, tetrahydrofurfuryl alcohol, phenol and resorcinol as well as halogenated derivatives of the aforementioned compounds. Still other promoters that may be employed are the heterofunctional alkanol amines or alcamines including mono-, di- and triethanol, propanol and butanol amines.

The amount of a thickening promoter employed, whether it be an individual compound or a mixture, will vary according to the desired result and, as a practical matter, general economic considerations. When the amount of polymer sulfonate employed is within the usual range, e.g., about 0.1 up to about 10 percent by weight of the total aqueous composition, measurable enhancement of the resulting thickening effect is achieved by incorporating into such solution as little as about 0.5 percent by weight of the solution of a thickening promoter. Preferably, the amount of the thickening promoter employed is from about 1 up to about 10 percent by weight of the aqueous solution. The upper limit is not critical, however, as the benefits of the invention may be observed when as much as 30 percent by weight of the promoter is employed.

Water-dispersible polymer sulfonates that may be employed in the present invention include any polymer sulfonates which are either highly water swellable or completely water-soluble. Such polymers may be obtained by polymerizing ethylenically unsaturated monomer compositions of which at least a major proportion, e.g., at least about 60 percent, is a sulfonated, monoethylenically unsaturated monomer. It is generally believed that at least about 60 percent of the combined monomer units should have sulfonic substitution in order to provide at least a water-swellable product. Higher amounts of sulfonic substitution tend to give increasing water-solubility. Other water-dispersible polymer sulfonates can be obtained by direct sulfonation of linear or toluene-soluble polymers of ethylenically unsaturated monomers in which polymers at least a major proportion of the combined monomer units is capable of substitution with a sulfonate group in the presence of known sulfonating reagents. Still other sources of water-dispersible polysulfonate resins are the sulfonation products of phenol-formaldehyde and the like sulfonatable condensation polymer systems.

The term "sulfonate" as employed herein means the free sulfonic acid and its salts wherein the cationic counter ion may be correspondingly hydrogen or a metal, ammonium, amine and the like salt-forming cations. Specific salt forming moieties for the purpose of illustration are the alkali metals such as sodium, potassium, cesium and lithium, the alkaline earth metals such as magnesium and calcium and the alkylamines such as methylamine, dimethylamine and trimethylamine.

When the polymer sulfonates are prepared by sulfonating a starting or base polymer, the polymer is preferably a toluene-soluble, thermoplastic, high molecular weight addition polymer having in combined form at least about 60 percent by weight of a monoalkenyl aromatic hydrocarbon or nuclear chlorinated alkenyl hydrocarbon having the general formula:

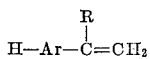

wherein H–Ar is a monovalent hydrocarbon or nuclear halogenated hydrocarbon radical having its valence bond on a carbon atom of a sulfonatable aromatic nucleus and R is a hydrogen or methyl radical. By "sulfonatable" is meant that the nucleus of the aromatic radical must have at least one hydrogen atom replaceable by a sulfonic acid group by reaction with a known sulfonating agent such as, for example, sulfuric acid, sulfur trioxide or chlorosulfonic acid.

Examples of sulfontatable base polymer resins are the solid, toluene-soluble, homopolymers of styrene, α-methylstyrene, ar-methylstyrenes (ar-vinyltoluenes), ar-dimethylstyrenes, α-ar-dimethylstyrenes, ar-ethylstyrenes, vinylnaphthalenes and ar-chlorostyrenes; copolymers of two or more of such monoalkenylaromatic compounds, e.g., copolymers of styrene and ar-vinyltoluene and copolymers of styrene and α-methylstyrene; and copolymers of a major proportion, e.g., at least about 60 percent by weight, of one or more of such monoalkenylaromatic compounds and a minor proportion of one or more other monoethylenically unsaturated compounds that do not sulfonate in combined form when subjected to the sulfonating reagent. Examples of such copolymerizable compounds are isobutylene, acrylonitrile, acrylamide, alkyl esters of acrylic and methacrylic acids, etc.

In addition to the above-described polymers, which are essentially linear in character, lightly cross-linked polymers can also be employed as the base polymer for the sulfonation reaction. Such polymers are readily prepared by incorporating into the monomeric reaction mixture from which the above base polymers are prepared, a small quantity, e.g., up to about 2 percent of a polyfunctional cross-linking agent, such as divinylbenzene, divinylbenzenesulfonic acid, methylenebisacrylamide and the like. The resulting lightly cross-linked polymers are especially useful in the preparation of highly water-swellable grades of polymer sulfonate resins.

The above-described base polymers are, of course, well known and likewise methods for carrying out the sulfonation thereof are well established in the art. For examples of such methods, see United States Letters Patents Nos. 2,683,137; 2,809,959; 2,821,522 and 2,835,655. Sulfonation should be carried out to an extent at least sufficient to provide a water-swellable polymer. For this purpose, it is generally believed that sulfonation of about 60 percent of the combined monomers is sufficient but, as will be understood by those skilled in the art, the effect of certain variables such as the molecular weight of the polymeric material being sulfonated, the amount of sulfone or other cross-linking and the extent of polymer chain scission will also affect the water-dispersibility of the resulting resin.

As mentioned above, the water-dispersible polysulfonate resins can also be prepared directly as the reaction product of polymerizable mixtures of monomers comprising a sufficient amount of a sulfonated monomer to provide at least a water-swellable resin product. Such polymers can be prepared in forms which are linear or lightly cross-linked.

The preparation of vinyl aromatic sulfonic acids that may be employed in the polymerization of such polymers is taught by Mock in United States Letters Patent No. 2,821,549. Such monomers can be homopolymerized in aqueous solutions according to known techniques. Mass polymerization techniques may be employed to prepare copolymers of such monomers with other monoethylenically unsaturated monomers.

The amount of polymer sulfonate employed in the practice of the invention will vary according to the desired thickening effect and the character of the sulfonated resin, e.g., whether it is lightly cross-linked or essentially linear. In those instances when the polymer sulfonate is initially dispersible in the salt solution to be thickened without the presence of a thickening promoter of the invention, effective increases in the viscosity of the solution are obtained with as little as about 0.05 percent by weight of the polymer sulfonate based on the weight of the solution. While there is no critical upper limit on the amount of polymer sulfonate that can be dispersed in the solution, usually from about 0.1 up to about 10 percent of the polymer sulfonate is adequate to achieve any desired thickening effect varying from relatively small increases in viscosity to the production of gel-like masses. The incorporation of the thickening promoter of the invention into such solutions substantially enhances the thickening effect that is obtained, and substantially reduces the amount of polymer sulfonate required to obtain a given viscosity. In those instances when the polymer sulfonate is not initially dispersible in the aqueous salt solution to be thickened without the presence of the thickening promoter of the invention, a small but effective quantity, e.g., usually from about 1 up to about 5 percent by weight of the solution of the thickening promoter will produce a homogeneous thickened composition. Until the thickening promoter is added to the solution in such instances, little or no thickening effect is achieved.

The benefits of the invention will be observed with aqueous compositions containing a significant proportion of one or more water-soluble, inorganic, electrolytic salts. As little as about 0.1 percent by weight of the solution of such solutes is a significant proportion. The presence in solution of this amount of the salt will usually result in a pronounced decrease in the thickening effect provided by a given amount of a water-dispersible polymer sulfonate. Solutions with larger concentrations of the salt e.g., up to as much as about 40 to 50 percent by weight of the solution, can also be thickened with advantage in accordance with the present invention.

Specific aqueous salt compositions that can be thickened in accordance with the invention include aqueous solutions of one or more water-soluble, inorganic electrolytic salts wherein the cations are mono- and divalent ions derived from elements of groups IA and IIA, periods 2 through 6, groups IB and IIB, periods 4 through 5 according to Hubbard, Periodic Chart of the Atoms (1954 ed.), and, in addition, the elements manganese, iron, cobalt, nickel, tin and lead and the anions are those obtained from strong inorganic acids having an ionization constant above about $1 \times 10^{-1}$.

Moreover, in addition to the electrolytic salts the aqueous compositions thickened in accordance with the invention can also contain undissolved, e.g., suspended or dispersed, materials such as colloidally suspended pigments and clays and/or emulsified organic solvents as well as any of a large variety of other chemically compatible, water-soluble solutes which may be either inorganic or organic in nature.

The compositions of the present invention are prepared by mixing the constituents thereof together in conventional ways. Solely for illustration, it might be mentioned that such compositions are prepared by mixing a polymer sulfonate and thickening promotor into an aqueous solution of an electrolytic salt; by mixing both a polymer sulfonate and electrolytic salt into an aqueous solution of a thickening promoter; or by mixing together aqueous solutions of a polymer sulfonate, thickening promoter and electrolytic salt. While there may be differences in the initial characteristics of the thickened composition depending upon the method by which it is prepared, in general, the final properties of the thickened aqueous composition obtained at equilibrium will be determined by its composition and not the mode of its preparation.

The following examples are illustrative of the present invention and are not be construed as limiting.

EXAMPLE 1

To 1 molar solutions of certain salts was added 2 percent by weight of a sulfonated polyvinyltoluene composition in the ammonium salt form containing about 45 percent active polymer solids having a molecular weight of at least about 3,000,000 and an average degree of sulfonic substitution of about 98 percent. To a portion of each resulting solution was added 5 percent by weight of isopropanol as a thickening promoter. The viscosities of the polymer sulfonate-salt solutions at 25° C. with and without the promoter, as obtained with a Brookfield viscosimeter employing a No. 3 spindle rotated at 30 r.p.m. are set forth in the following Table 1:

*Table 1*

| Dissolved Salt | Brookfield Viscosity (c.p.s.) | |
| --- | --- | --- |
| | Without Promoter | With Promoter |
| Ferrous chloride | (1) | 16 |
| Cupric chloride | 16 | 30 |
| Magnesium chloride | 10 | 18 |
| Nickel chloride | 10 | 20 |
| Zinc chloride | 16 | 20 |
| Lead nitrate | (1) | 12 |
| Copper sulfate | 52 | 110 |

[1] Insoluble.

EXAMPLE 2

Dilute brine solutions such as may be encountered in operations involving the secondary recovery of petroleum were thickened with small amounts of the water-soluble polymer sulfonate employed in Example 1. The amounts of the thickening components employed and the concentration of sodium chloride in the brine are given along with the resulting Brookfield viscosity of the composition in the following Table 2.

*Table 2*

| Percent Polymer Sulfonate Composition | Percent [1] | Thickening Promoter | Percent Sodium Chloride in Solution | Brookfield Viscosity (Centipoises) |
| --- | --- | --- | --- | --- |
| 0.2 | (2) | | 3 | 7.5 |
| 0.2 | 5 | Diethylene glycol monoethyl ether. | 3 | 12 |
| 0.2 | 5 | Diethylene glycol mono-n-butyl ether. | 3 | 13.5 |
| 0.2 | 5 | Diethylene glycol monomethyl ether. | 3 | 10 |
| 0.2 | 5 | Ethylene glycol monophenyl ether. | 3 | 12.5 |
| 0.2 | 5 | Propylene glycol monomethyl ether. | 3 | 10 |
| 0.2 | 5 | Dipropylene glycol monomethyl ether. | 3 | 10 |
| 0.2 | 5 | Tripropylene glycol monomethyl ether. | 3 | 10 |
| 0.1 | (2) | | 0.15 | 11 |
| 0.1 | 10 | Diethylene glycol monoethyl ether. | 0.15 | 17 |

[1] Percentages are based on the total weight of the composition.
[2] Control.

EXAMPLE 3

The applicability of the thickening system of the present invention as a fluid loss additive for well drilling fluids was investigated with the following testing procedure. A calcium chloride brine containing 11.4 pounds of the salt per gallon was mixed with sufficient amounts of a polymer sulfonate composition consisting essentially of a homopolymer of sodium styrene sulfonate, said polymer having a molecular weight of about 5 million, and diethylene glycol monoethyl ether to provide, respectively, 0.39 and 3.9 percent by weight of the total composition of the respective additaments. The filtration properties of the resulting thickened composition were then measured in a Baroid standard filter press when subjected to 100 pounds per square inch at 24° C. The initial "spurt" loss was 4 cc. of liquid and after 7.5 minutes and 30 minute totals of 39 and 83 cc. of liquid were collected, respectively. Without the addition of diethylene glycol ethyl ether, the polysulfonate remained insoluble in the salt solution and no thickening was achieved.

In a manner similar to that of the foregoing examples, other aqueous compositions are thickened with the enhanced thickening system of the invention in the presence of up to 50 percent by weight of a dissolved, inorganic, electrolytic salt such as water-soluble alkali metal, alkaline earth metal, cupric, zinc, silver, cadmium, manganese, ferrous, cobaltous, nickel, stannous and lead salts of hydrobromic, hydriodic, perchloric, iodic, pyrophosphoric and the like strong inorganic acids.

What is claimed is:

1. A thickened composition of matter comprising water in which there is dissolved, at least about 0.1 percent by weight of (1) a water-soluble, inorganic salt having a cation selected from mono- and divalent cations derived from elements in groups IA and IIA, periods 2 through 6, groups IB and IIB, periods 4 through 5 and the elements manganese, iron, cobalt, nickel, tin and lead and an anion of an inorganic acid having an ionization constant above about $1 \times 10^{-1}$, (2) from about 0.05 up to about 10 percent by weight based on the weight of the solution of a water-dispersible polymer sulfonate, and (3) from about 0.5 up to 30 percent by weight based on the weight of the solution of a water-soluble thickening promoter selected from the group consisting of alkylene and polyoxyalkylene glycols wherein the recurring alkylene moieties contain from 2 to 4 carbon atoms, alkyl and aryl monoethers of the foregoing, the alkyls containing from 1 to 4 carbon atoms and the aryls containing from 6 to 10 carbon atoms, dimethylformamide, dimethylacetamide, dioxan, tetrahydrofuran, furfuryl alcohol, tetrahydrofurfuryl alcohol, phenol, resorcinol, mono-, di- and trialkanol amines wherein the alkanols contain from 2 to 4 carbon atoms and halogenated derivatives of the foregoing compounds.

2. A thickened composition of matter as in claim 1 wherein the water-soluble, inorganic salt is sodium chloride.

3. A thickened composition of matter as in claim 1 wherein the water-soluble, inorganic salt is calcium chloride.

4. A thickened composition of matter as in claim 1 wherein the water-soluble, inorganic salt is magnesium chloride.

5. The thickened composition of matter as in claim 1 wherein the water-dispersible, polymer sulfonate is a sulfonated polymer of ar-vinyltoluene.

6. A thickened composition of matter as in claim 1 wherein the water-dispersible, polymer sulfonate is a sulfonated lightly cross-linked polymer of ar-vinyltoluene.

7. A thickened composition of matter as in claim 1 wherein the water-dispersible, polymer sulfonate is a polymer of an alkali metal vinyl benzene sulfonate.

References Cited by the Examiner

UNITED STATES PATENTS

| | | | |
|---|---|---|---|
| 2,455,961 | 12/1948 | Walker | 252—75 |
| 2,587,501 | 2/1952 | Meadors | 252—8.5 |
| 2,612,485 | 9/1952 | Baer et al. | 252—8.5 |
| 2,786,027 | 3/1957 | Salathiel | 252—8.5 |
| 3,079,336 | 2/1963 | Stright et al. | 252—8.55 |

FOREIGN PATENTS 525,278   5/1956   Canada.

JULIUS GREENWALD, *Primary Examiner.*

JOSEPH R. LIBERMAN, *Examiner.*